(12) United States Patent
Tachiki

(10) Patent No.: US 7,107,829 B2
(45) Date of Patent: Sep. 19, 2006

(54) POWERTRAIN TESTING APPARATUS

(75) Inventor: Tsunetoshi Tachiki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 11/117,369

(22) Filed: Apr. 29, 2005

(65) Prior Publication Data

US 2005/0257606 A1 Nov. 24, 2005

(30) Foreign Application Priority Data

May 18, 2004 (JP) ............................. 2004-148201

(51) Int. Cl.
*G01M 15/00* (2006.01)
(52) U.S. Cl. .................................... 73/118.1
(58) Field of Classification Search ................ 73/116, 73/117.2, 117.3, 118.1, 119 R
See application file for complete search history.

(56) References Cited

U.S. PATENT DOCUMENTS

| | | | |
|---|---|---|---|
| 4,466,294 A * | 8/1984 | Bennington et al. ..... | 73/862.13 |
| 5,877,420 A * | 3/1999 | Moradi et al. ............ | 73/462 |
| 5,893,892 A * | 4/1999 | Loeffler ................... | 701/29 |
| 5,922,952 A * | 7/1999 | Moradi et al. ............ | 73/462 |
| 6,378,374 B1 * | 4/2002 | Kochersberger .......... | 73/593 |
| 6,530,270 B1 * | 3/2003 | Cheng ..................... | 73/118.1 |
| 6,578,411 B1 * | 6/2003 | Cheng ..................... | 73/118.1 |
| 2003/0084709 A1 * | 5/2003 | Cheng ..................... | 73/116 |

FOREIGN PATENT DOCUMENTS

| | | |
|---|---|---|
| JP | 2000-258303 | 9/2000 |
| JP | 2001-165282 | 6/2001 |

* cited by examiner

*Primary Examiner*—Eric S. McCall
(74) *Attorney, Agent, or Firm*—Bacon & Thomas, PLLC

(57) ABSTRACT

A powertrain testing apparatus for testing performance testing of a powertrain provided with an input shaft and an output shaft that are disposed on different axes. The testing apparatus includes an input motor that replicates rotation of a vehicle-drive engine, an output motor that replicates the load applied to the output shaft in actual service, an input side support having an input connection shaft for connection to the input shaft, an output side support having an output connection shaft for connection to the output shaft, and a vibration generator that replicates vibration transmitted from a road surface in actual service. Vertical and horizontal adjustment units enable inter-shaft distances D1 and D2 between the input connection shaft and the output connection shaft to be changed. Constant velocity joints respectively connect the input motor and the input connection shaft and the output motor and the output connection shaft, thus enabling eccentric positioning thereof.

20 Claims, 6 Drawing Sheets

POWERTRAIN TESTING APPARATUS

INCORPORATION BY REFERENCE

The disclosure of Japanese Patent Application No. 2004-148201 filed on May 18, 2004 including the specification, drawings and abstract is incorporated herein by reference in its entirety.

BACKGROUND OF THE INVENTION

1. Field of the Invention

The present invention relates to a powertrain testing apparatus for performance testing of a powertrain having an input shaft and an output shaft that are disposed on different axes.

2. Description of the Related Art

Performance testing of powertrains, e.g., an automatic transmission (hereinafter referred to as "A/T"), employs an A/T testing apparatus 9 like that shown in FIG. 6. This A/T testing apparatus 9 includes an input motor 92 that simulates and replicates rotation of an engine, and an output motor 93 that simulates and replicates load that is applied to an output shaft 83 of an A/T 8. The A/T testing apparatus 9 includes a support stand 94 for holding the housing 81 of the A/T 8, an input motor 92 connected to the input shaft 82 of the A/T 8 and an output motor 92 connected to the output shaft 83 of the A/T 8. When the A/T 8 is mounted and connected, tests of the performance of its shifting operations and the like are performed by rotating the input motor 92 at a desired torque and rotational speed. The A/T testing method using the A/T testing apparatus 9 described above may be, for example, like that disclosed in Japanese Patent Laid-Open Publication No. 2001-165282 or No. 2000-258303.

However, as noted above, with the A/T testing apparatus 9 disclosed in the related art, performance testing is carried out with the housing 81 of the A/T 8 in a fixed state. Accordingly, in performance testing using the A/T testing apparatus 9, it is not possible to check what effect vibrations, and the like, transmitted from a road surface, have on the A/T 8. Such vibrations would be transmitted to the A/T 8 if it were mounted in actual travel of a vehicle along a road.

In addition, more particularly, in the case of A/Ts used in front-wheel drive vehicles, inter-shaft distances between an input shaft and a pair of output shafts, that are disposed on an axis that is different from that of the input shaft, vary depending on the type of A/T. Accordingly, there is a need for a testing apparatus that can be easily adjusted for different inter-shaft distances.

SUMMARY OF THE INVENTION

The present invention solves the above-described problems by providing a powertrain testing apparatus that can (1) test various types of powertrains that have different inter-shaft distances between their input and output shafts, and (2) simulate the impact of vibrations transmitted from a road surface to a powertrain in actual travel, while conducting the performance testing.

The powertrain testing apparatus of the present invention is provided with a vibration generator that vibrates an input side support of the powertrain testing apparatus to simulate the vibrations transmitted from a road surface to the powertrain in actual travel.

Furthermore, the powertrain testing apparatus of the present invention provides performance testing of a powertrain for a front-wheel drive vehicle which has its input shaft and output shaft disposed on different axes. Such powertrains, unlike a powertrain for a rear wheel drive vehicle, have inter-shaft distances between the input shaft and the output shaft that vary depending on the model.

Moreover, the powertrain testing apparatus of the present invention includes a vertical adjustment unit and a horizontal adjustment unit. These relative movement (adjustment) units make it possible to change the inter-shaft distances in vertical and horizontal directions between (a) an input connection shaft of the input side support and (b) an output connection shaft of an output side support of the powertrain testing apparatus.

Accordingly, the powertrain testing apparatus is able to provide performance testing for a variety of types of powertrains having different inter-shaft distances between the input shaft and the output shaft. As a result, the powertrain testing apparatus of the present invention offers outstanding versatility.

When performance testing a powertrain, the powertrain is mounted in the powertrain testing apparatus such that: (a) the housing of the powertrain is attached to the attachment portion of the input side support; and, at the same time, (b) the input shaft is connected to the input connection shaft; and (c) the output shaft is connected to the output connection shaft of the output side support. Once the powertrain has been mounted in the powertrain testing apparatus, the input motor is started so as to simulate and replicate the rotation of a vehicle-drive engine, i.e., the input shaft is rotated via the input connection shaft. At the same time, the output shaft is rotated via the output connection shaft while subjected to inertial resistance by the output motor.

When the vibration generator is activated while the input and output shafts are rotating as described above, both the input and output shafts are caused to vibrate by vibrations received from the vibration generator. As a result, with the powertrain testing apparatus according to the present invention, it is possible to check what impact vibrations transmitted from a road surface would have on the powertrain.

The powertrain of the present invention may be, instead of an automatic transmission (hereinafter referred to as "A/T") designed for a front-wheel vehicle (hereinafter referred to as "FF vehicle"), any one of various power transmission devices that transmit power.

Furthermore, rotation may be replicated for any vehicle drive power plant, for example, a combustion engine, a drive motor of an electric vehicle, or a hybrid vehicle, or the like.

The powertrain testing apparatus according to the present invention makes it possible to conduct a variety of tests, such as testing of powertrain shift operations, testing of shock caused by engine stalling, durability testing, and the like. Moreover, in all such performance tests it is possible to determine what impact vibrations generated by the rotation of the engine have on the powertrain.

Further, it is also possible to check, for example, whether the powertrain has any fluid leakages or generates any abnormal noises when vibrated.

The vibration generator may utilize a hydraulic cylinder with a piston that reciprocates therein through a preset stroke. By utilizing such a hydraulic mechanism, it is possible to transmit the vibrations generated by the vibration generator and the input motor to the powertrain with greater effectiveness to make an output rod of the hydraulic cylinder vibrate.

Moreover, it is preferred that the (a) input motor and the input connection shaft, and (b) the output motor and the output connection shaft be connected by respective constant velocity joints so that (1) the input motor and the input connection shaft and (2) the output motor and the output connection shaft can be arranged eccentrically. In this manner, when the powertrain is mounted on the powertrain testing apparatus and the input motor is started, the input shaft is rotated via the input side constant velocity joint and the input connection shaft, and, at the same time, the output shaft is rotated via the output connection shaft and the output side constant velocity joint while receiving inertial resistance from the output motor. Further, if the vibration generator is activated the powertrain can be vibrated such that the input shaft and the output shaft repeatedly move between positions aligned with and eccentric to the input motor and the output motor, respectively. This repeated movement between aligned and eccentric relative positions is made possible by the constant velocity joints.

The output shaft of the powertrain is preferably a pair of output shafts disposed on a single axis. With the apparatus of the present invention, it is possible to carry out the previously described wide-ranging and advanced level performance tests for, in particular, a powertrain having a pair of axially aligned shafts and designed for installation in a front-wheel drive vehicle, or the like.

Preferably, the vibration generator includes a vibration output shaft having an initial position that can be changed. In this case, the vertical adjustment unit can change the inter-shaft vertical distance between the input connection shaft and the output connection shaft by changing the initial position of the vibration output shaft. By using such a vibration generator the structure of the powertrain testing apparatus can be simplified.

In addition, the powertrain testing apparatus preferably further includes: (a) an input side damper which is disposed between the input side support and the vibration generator and which enables the input side support to be vibrated; and (b) an output side damper which is disposed between the output side support and a fixed surface on which the output side support is positioned and which enables the output side support to be vibrated.

Provision of the constant velocity joints in combination with the dampers enables the powertrain to be mounted on the powertrain testing apparatus such that the powertrain vibrates due to receiving vibrations generated by the vibration generator and the input motor. Accordingly, when the powertrain is mounted in the in the powertrain testing apparatus it is possible to create a simulated state that is very similar to when the powertrain is connected to an engine in actual service. Accordingly, it is possible to conduct the performance testing with an improved degree of accuracy.

The dampers may be any structural members capable of elastic deformation, such as rubber or one or more springs. Alternatively, it is possible to use a structural member that includes a cylinder, a gas cushion or the like, which can use reaction force for reciprocal movement.

The input side support preferably includes an input side locking mechanism that holds the input side support such that it does not vibrate due to the input side damper when the input connection shaft is to be connected to the input shaft of the powertrain.

Use of the input side locking mechanism to hold the input side support makes it easier to connect the input connection shaft of the input side support to the input shaft of the powertrain.

Likewise, the output side support preferably includes an output side locking mechanism that holds the output side support such that it does not vibrate due to the output side damper when the output connection shaft is to be connected to the output shaft of the powertrain. Use of the output side locking mechanism to hold still the output side support makes it easier to connect the output connection shaft of the output side support to the output shaft of the powertrain.

Further, the input motor is preferably able to generate a cyclical fluctuating torque in order to better simulate and replicate vibration generated by the vehicle drive engine.

Thus, the present invention makes it possible to use the input motor to stimulate rotation that is, as far as possible, similar to that generated by an internal combustion engine. Accordingly, during performance testing utilizing the powertrain testing apparatus of the present invention, it is possible to check what impact vibrations generated by the fluctuating torque of the input motor have on the powertrain.

DETAILED DESCRIPTION OF THE PREFERRED EMBODIMENTS

Figure 1:
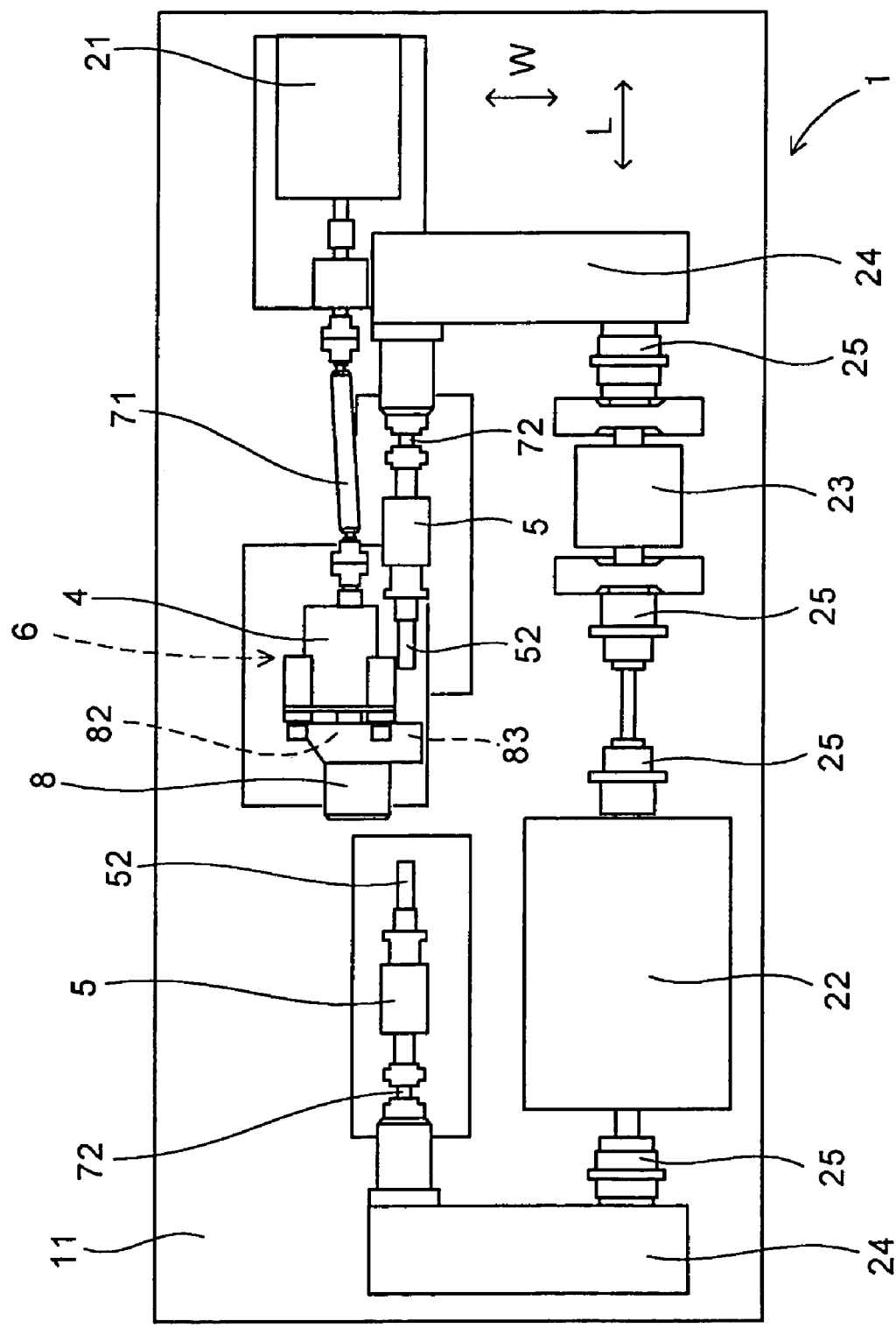
FIG. 1 is a plan view of the overall configuration of a powertrain testing apparatus according to an embodiment of the present invention.

A preferred embodiment of the powertrain testing apparatus according to the present invention will now be described with reference to the drawings. In the description which follows, "H" indicates the vertical direction; "forward-backward direction L" indicates the direction in which the input shaft 82 and the pair of output shafts 83 extend ("axial direction C") when the powertrain 8 is horizontally mounted in the powertrain testing apparatus 1; and, "left-right direction W" is a direction orthogonal to the direction in which the input shaft 82 and the output shaft 83 of the powertrain 8 extend when the powertrain 8 is horizontally mounted.

FIGS. 1 to 5 show a powertrain testing apparatus 1 according to a preferred embodiment of the present invention for performance testing of a powertrain 8 including an input shaft 82 and a pair of output shafts 83 (see FIG. 5) that are disposed on an axis that is different from that of the input shaft 82. The powertrain 8 is an automatic transmission (hereinafter referred to as "A/T") for a front-wheel drive vehicle, and the powertrain testing apparatus 1 is an A/T testing apparatus.

The powertrain testing apparatus 1 includes an input motor 21, an output motor 22, an input side support 4, a pair of output side supports 5, a vibration generator 6, a vertical adjustment unit 31, and a horizontal adjustment unit 32.

The input motor 21 is used to simulate and replicate rotation generated by a vehicle drive in actual service, and the output motor 22 is used to simulate and replicate loads applied to the pair of output shafts 83 in actual service.

The input side support 4 is provided with an input connection shaft 42 for connection to the input shaft 82 of the powertrain 8, and an attachment portion 411 for securing the housing 81 of the powertrain 8. The pair of output side supports 5 are respectively provided with output connection shafts 52 that are respectively connected to the output shafts 83 of the powertrain 8.

The vibration generator 6 vibrates the input side support 4 in order to simulate and replicate the vibrations that would be transmitted to the powertrain 8 from a road surface if the powertrain 8 were mounted in an actual traveling vehicle.

Figure 2:
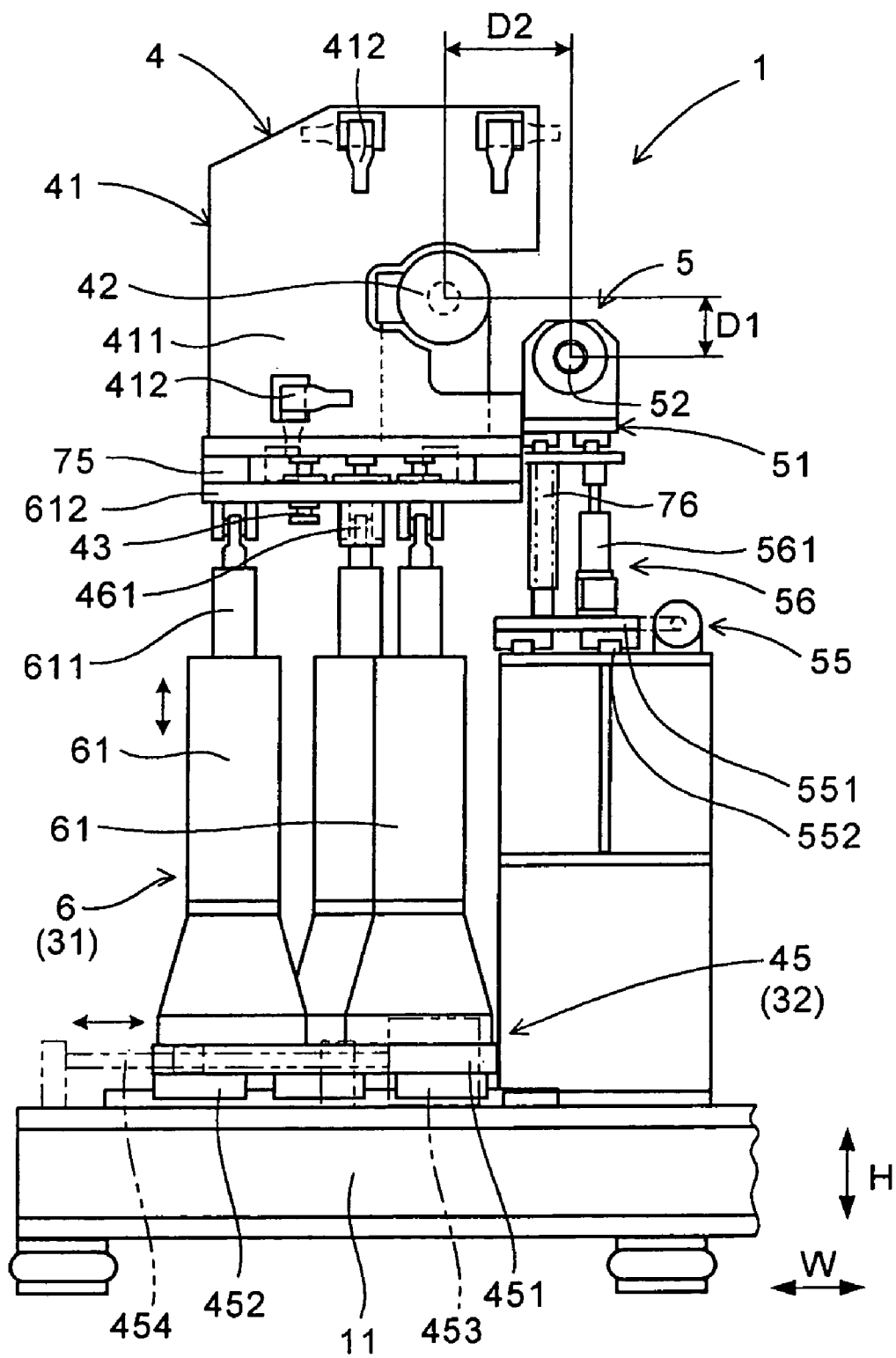
FIG. 2 is an end view (widthwise) of an input side support and an output side support of the powertrain testing apparatus of FIG. 1.
Figure 3:
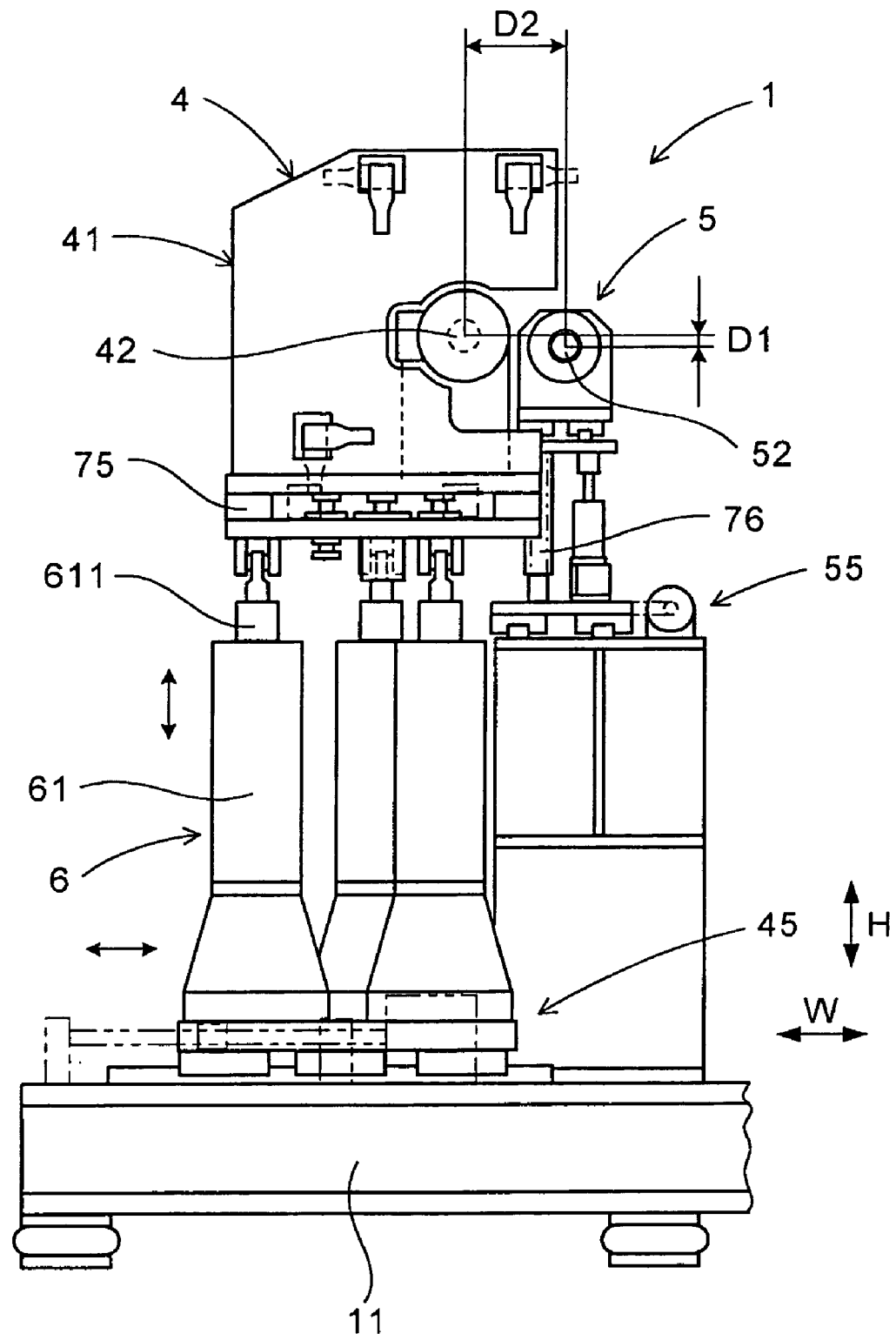
FIG. 3 is another end view, like FIG. 2 but with each inter-shaft distance changed in vertical and horizontal directions.

Moreover, as shown in FIGS. 2 and 3, the vertical adjustment unit 31 changes the vertical inter-shaft distance D1 between the input connection shaft 42 and each of the output connection shafts 52. This is achieved by causing the input side support 4 and each of the output side supports 5 to move relative to each other. Further, the horizontal adjustment unit 32 is used to change the horizontal inter-shaft distance D2 between the input connection shaft 42 and each of the output connection shafts 52, by causing movement of the input side support 4 and each of the output side supports 5 relative to each other.

Figure 4:
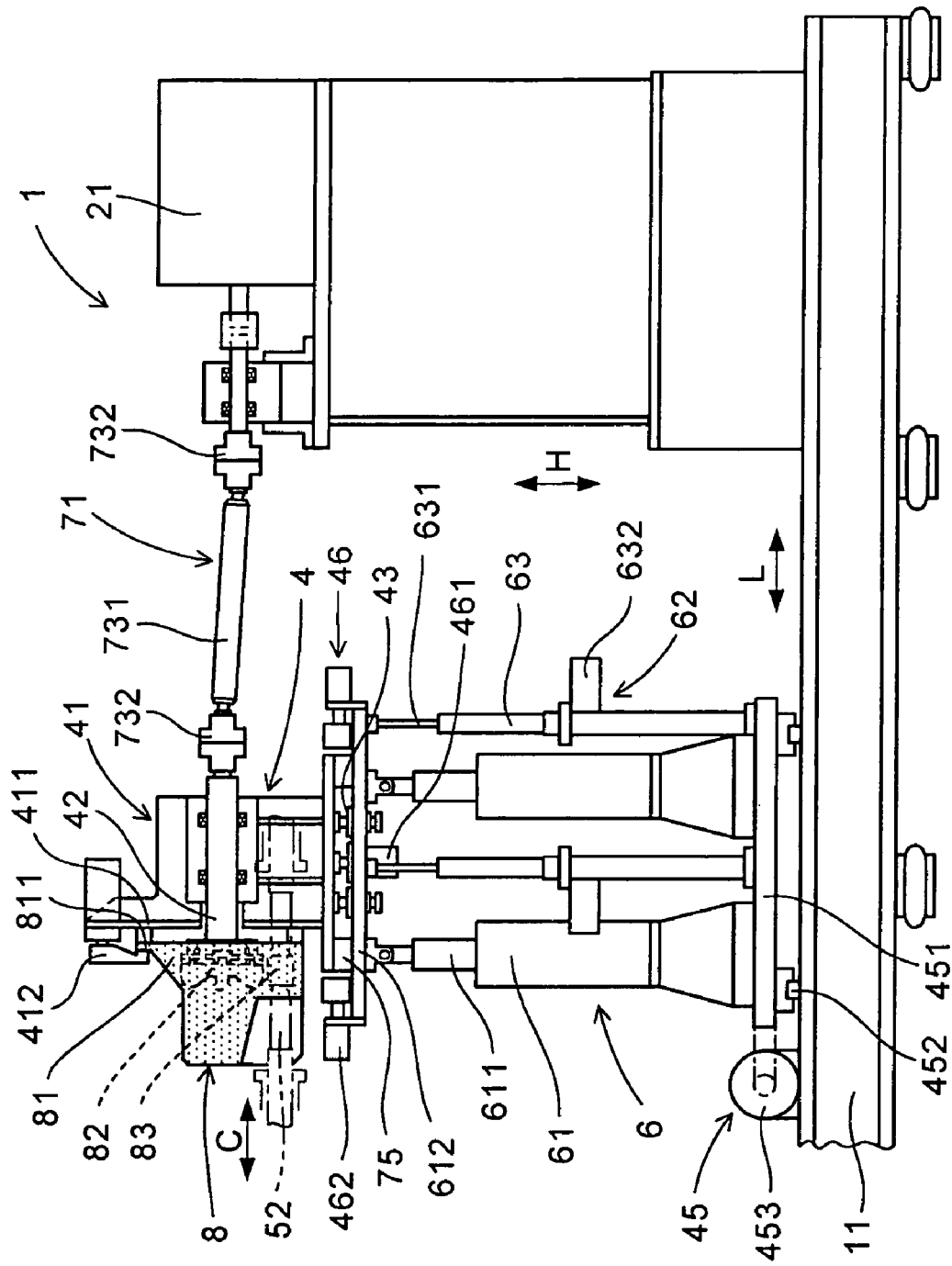
FIG. 4 is a side view (longitudinal dimension) of the input side support of the powertrain testing apparatus of FIG. 1.
Figure 5:
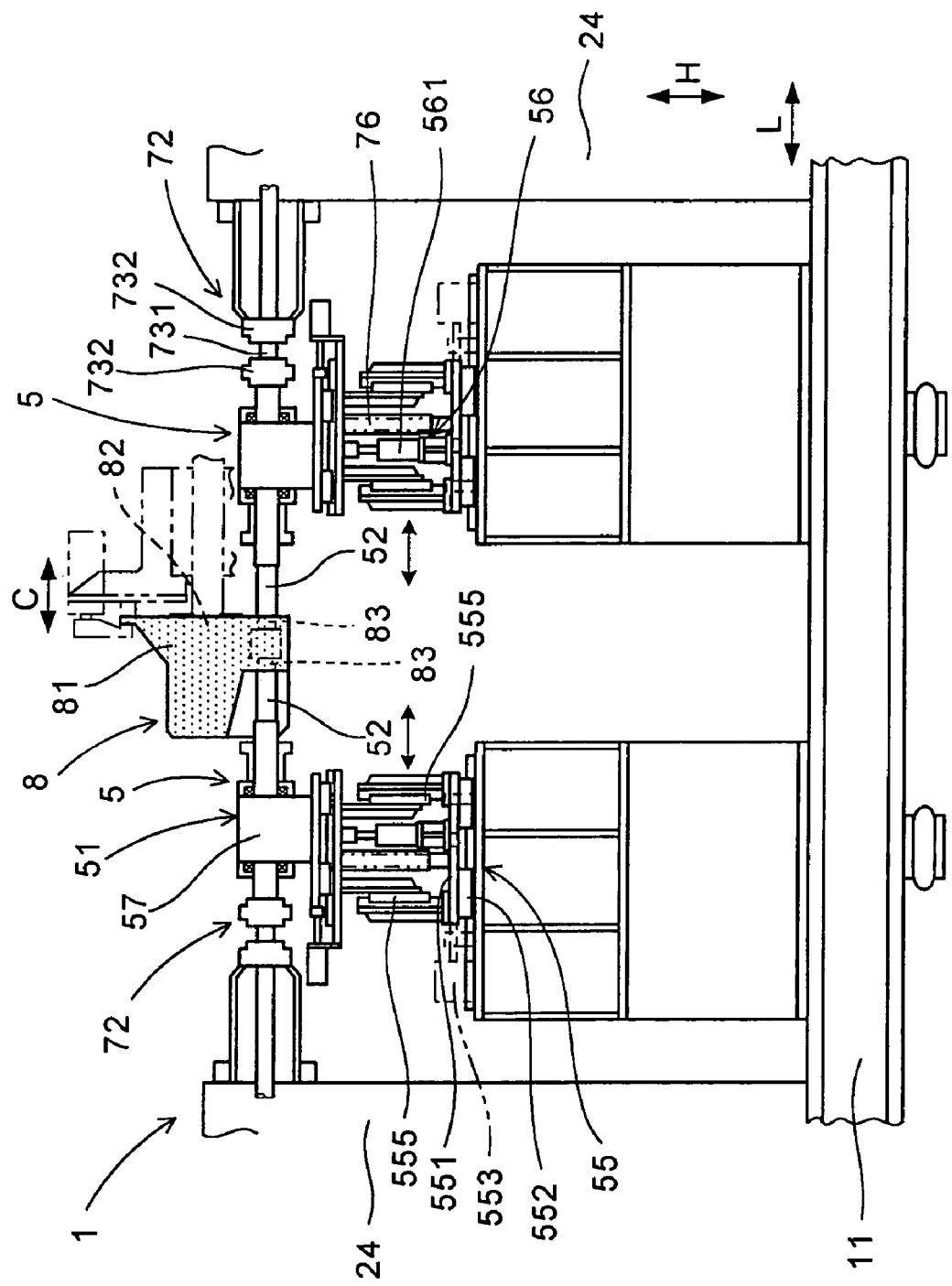
FIG. 5 is a side view (longitudinal dimension) of the output side support of the powertrain testing apparatus of FIG. 1.
Figure 6:
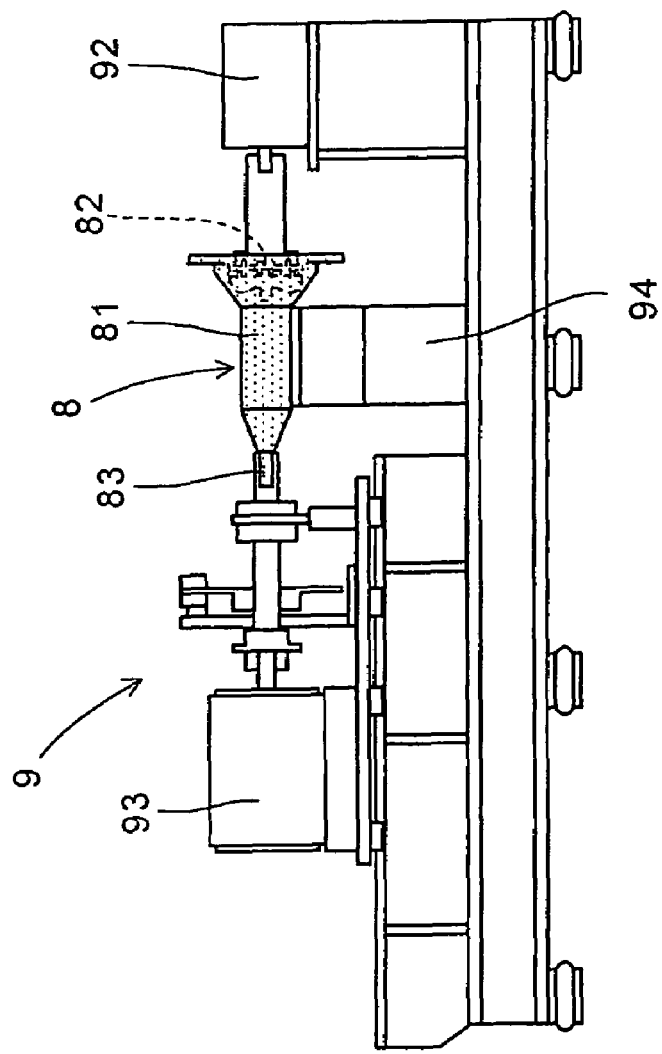
FIG. 6 is plan view of the overall configuration of a powertrain testing apparatus disclosed in the related art.

As shown in FIGS. 4 and 5, the input motor 21 and the input connection shaft 42 are connected by an input side constant velocity joint 71 that enables the input motor 21 and the input connection shaft 42 to be positioned off-center from each other. Similarly, the output motor 22 and the output connection shafts 52 are connected by output side constant velocity joints 72 that enable the output motor 22 and the output connection shafts 52 to be positioned off-center from each other. It should be noted that the term "constant velocity joint", as used in this specification, is taken to also include a "constant velocity universal joint".

It should be noted that the input shaft 82 and the pair of output shafts 83 of the powertrain 8 are disposed in parallel, rather than coaxially.

The powertrain testing apparatus 1 is controlled by a control unit (not shown), and the input motor 21 and the output motor 22 output respective predetermined rotational speeds and torques in accordance with commands received from the control unit. In addition, the vibration generator 6 causes the input side support 4 to move reciprocally in the vertical direction H with a predetermined stroke length and cycle, based on a command from the control unit.

The control unit has an input interface that receives information related to (a) the model of the powertrain 8; (b) the inter-axis vertical distance D1 and the inter-shaft horizontal distance D2 between the input shaft 82 and the pair of output shafts 83; and (c) the axial distance C between the input shaft 82 and the pair of output shafts 83.

Moreover, as shown in FIG. 1, all of the structural components of the powertrain testing apparatus 1, namely, the input motor 21, the output motor 22, the input side support 4, the vibration generator 6, the pair of output side supports 5, and the like, are positioned on top of a single pedestal 11.

The input motor 21, as can be seen in FIGS. 1 and 4, generates a cyclical fluctuating torque in order to simulate and replicate the vibrations from a vehicle-drive engine. This fluctuating torque can be generated, for example, utilizing a servo motor as the input motor 21 and varying the torque of the servo motor. In this manner, a fluctuating torque is generated in order to replicate the torque generated by an internal combustion engine.

As shown in FIGS. 1 and 5, the output motor 22 electrically generates a moment of inertia (inertial resistance) in order to simulate and replicate the load applied to the output shaft 83 of the powertrain 8 in actual service. The magnitude of the inertial resistance generated by the output motor 22 is set to take into account (a) inertial resistance generated in actual operation in a vehicle from the output shafts 83 of the powertrain 8 to each drive wheel through respective drive shafts, etc., (not shown), and (b) rolling resistance of the road surface on the drive wheels.

In the powertrain testing apparatus 1 according to the present embodiment, as shown in FIGS. 1 and 5, the pair of output side supports 5 are positioned so as to correspond with the pair of output shafts 83 of the powertrain 8. The output connection shafts 52 are connected to the single output motor 22 via the respective output side constant velocity joints 72.

In addition, a flywheel 23 is connected to the output motor 22 via joints 25. The flywheel 23 simulates and replicates the inertial resistance attributable to the weight of an actual vehicle.

The output connection shaft 52 of each output side support 5 is connected, via one of a pair of force transmission mechanisms 24 (which, in the present embodiment, are chain mechanisms) and the joints 25, to the output motor 22 and the flywheel 23.

The present invention makes it possible to use the output motor 22 to simulate and replicate the inertial resistance generated by the road surface and applied to the output shafts 83 of the powertrain 8. Further, it is possible to use the flywheel 23 to simulate and replicate the inertial torque of the output shafts 83 of the powertrain 8 generated by the weight of a vehicle.

As can be seen in FIGS. 4 and 5, each of the constant velocity joints 71 and 72 has two joint portions 732 and a shaft portion 731 connected therebetween. With this configuration, the respective shaft portions 731 that maintain the axes of the two joint portions 732 parallel to each other can be inclined, whereby it is possible to make the axial centers of the joint portions 732 of the constant velocity joints 71 and 72 eccentric relative to each other.

In this embodiment, each of the constant velocity joints 71 and 72 is a constant velocity ball joint having a plurality of balls and a bearing member that are disposed between the ends of the joint portions 732 and the shaft portions 731. The bearing member is provided with a guide groove that limits the movement of the balls axially of the shaft portion 731.

As can be seen in FIGS. 1 and 4, if the shaft portion 731 of the input side constant velocity joint 71 is inclined to a slanting position, the axis of the input connection shaft 42 and the axis of the input motor 21 are aligned, and the input side support 4 can be vibrated in a direction orthogonal to their axis.

Moreover, as can be seen from FIGS. 1 and 5, if the shaft portions 731 of the output side constant velocity joints 72 are inclined to a slanting position, the axis of the output connection shaft 52 and the axis of the output motor 22 are aligned, and the output side support 5 can be vibrated in a direction orthogonal to the aligned axes.

The input side support 4 of the present embodiment, as shown in FIG. 4, has: a main body 41 including the attachment portion 411 for attaching the powertrain 8; and the input connection shaft 42 that is supported for rotation relative to the main body 41. In the present embodiment, a flange 811 on the input shaft 82 side of the housing 81 of the powertrain 8 is secured by the attachment device 411. The flange 811 is clamped by an attachment flange 412 of the attachment device 411, whereby the powertrain 8 is fixed to the input side support 4.

In addition, as shown in FIGS. 2 to 4, the powertrain testing apparatus 1 includes the vibration generator 6 that vibrates the input side support 4 in order to simulate and replicate vibration that would be transmitted to the powertrain 8 from a road surface, if the powertrain 8 were in actual service in a vehicle.

The vibration generator 6 includes a plurality of vibration cylinders 61 (in the present embodiment, hydraulic pressure cylinders), and generates vibrations by causing a rod 611 (vibration output shaft), which is a piston or an extension from a piston in each of the vibration cylinders 61, to move in a reciprocating manner. The vibration generator 6 of the present embodiment generates vertical vibration by using a control device to perform servo control of the vibration cylinders 61 (in this embodiment, there are three).

As shown in FIGS. 2 and 3, the initial position of the rods 611 of the vibration cylinders 61 of the vibration generator 6 can be changed in order to change the inter-shaft vertical distance D1 between the input connection shaft 42 and the output connection shafts 52. The vertical adjustment unit 31 according to the present embodiment is the vibration generator 6.

A position detection sensor (not shown), that detects the position of the rod 611, is disposed in each vibration cylinder 61, and position data generated by this position detection sensor is transmitted to the control unit. The control unit monitors the position data, and is able to change the initial position of each of the rods 611 of the vibration cylinder 61.

As shown in FIGS. 2 to 4, a plurality of input side dampers 75 are interposed between the input side support 4 and the vibration generator 6. The input side dampers 75 of the present embodiment are made of a vibration proof material that undergoes elastic deformation, e.g., vibration proof rubber.

The rod 611 of each cylinder 61 is attached to a vibration plate 612, and the input side support 4 is mounted on the vibration plate 612 with the input side dampers 75 (in this case, four) interposed therebetween.

The vibration plate 612 and the input side support 4 are also connected by a vertical movement guide 43 that guides the vertical movement (vertical vibration).

As can be seen from FIG. 4, the input side support 4 includes a input side locking mechanism 46 that enables the input side support 4 to be held so that it can not be vibrated by the input side damper 75 when the input connection shaft 42 is connected to the input shaft 82 of the powertrain 8. Accordingly, it is possible to hold still the input side support 4 while its input connection shaft 42 is connected to the input shaft 82 of the powertrain 8, which makes the connection operation easier to perform.

The input side locking mechanism 46 of the present embodiment includes vertical cylinders 461 for holding the input side support 4 against vertical movement and horizontal cylinders 462 for holding the input side support 4 against horizontal movement. In the present embodiment, both the vertical cylinders 461 and the horizontal cylinders 462 are air cylinders.

Thus, in the present embodiment, the vertical cylinders 461 and the horizontal cylinders 462 serve to prevent relative movement between the vibration plate 612 and the main body 41 of the input side support 4.

Further, as shown in FIG. 4, anti-drop mechanisms 62 are provided between the vibration plate 612 and the main body 41 of the input side support 4. The anti-drop mechanisms 62 inhibit the input side support 4 from unexpectedly dropping as a result of an interruption of the power supply for the powertrain testing apparatus 1. The anti-drop mechanisms 62 are positioned in parallel with the cylinders 61 of the vibration generator 6, and include respective lock cylinders 63 (in the present embodiment, hydraulic cylinders), and electromagnetic valves 632.

Each anti-drop mechanism 62 moves a rod 631 of a lock cylinder 63 in accompaniment with movement of a rod 611 of a vibration cylinder 61. Accordingly, if there is a power loss, or the like, as described above, the electromagnetic valve 632 is actuated so as to fix the rod 631 of the lock cylinder 63, thereby preventing the input side support 4 from dropping unexpectedly.

Further, as is apparent from FIGS. 2 to 4, the horizontal adjustment unit 32 of the present embodiment includes an input side positioning unit 45 that is capable of moving the vibration generator 6 and the input side support 4 horizontally, in the direction of dimension W of the powertrain testing apparatus 1. This input side positioning unit 45 includes a slide base 451 on which the vibration generator 6 is mounted, slide guides 452, a motor 453, and a force conversion mechanism 454. More specifically, the plurality of slide guides 452 guide the sliding movement of the slide base 451 in the horizontal direction W; the motor 453 moves the slide base 451 along the slide guides 452; and the force conversion mechanism 454 converts the rotational force generated by the motor 453 to linear force.

With the present embodiment, it is possible to change the inter-shaft horizontal distance D2 between the input connection shaft 42 and the output connection shafts 52 by moving the vibration generator 6 and the input side support 4 in the direction W with respect to the output side supports 5.

As can be seen in FIG. 5, each of the output side supports 5 of the present embodiment has a main body 51, which rotatably supports output connection shafts 52.

In addition, each main body 51 is provided with a torque measurement device 57 that can measure the torque load applied to the output shaft 83 of the powertrain 8 by measuring the torque generated by the output connection shafts 52.

Each output side support 5, as is clear from FIGS. 2, 3 and 5, can be moved forward-backward, i.e., along dimension L of the powertrain testing apparatus 1, by respective output side positioning units 55, namely, each output side support 5 can be moved axially of the output shafts 83, i.e., in direction C.

Each output side positioning unit 55 includes a slide base 551 on which the output side support 5 is mounted, a plurality of slide guides 552, and an air cylinder 553. More specifically, the slide guides 552 guide the sliding movement of the slide base 551 forward-backward, i.e., in direction L; and the air cylinder 553 moves the slide base 551 along the slide guides 552.

Instead of the air cylinder 553, it is possible to utilize a motor, in combination with a force conversion mechanism that converts the rotational force of the motor into linear force. In addition, a brake device may be provided in the main body 51 of each output side support 5. This brake device can be utilized to simulate the load changes that are applied to the output shafts 83 of the powertrain 8 when braking of a vehicle.

As can be seen in FIG. 5, each output side support 5 of the present embodiment is mounted on the slide base 551 with an output side damper 76 interposed therebetween. The output side dampers 76 of the present embodiment are springs that allow the output side supports to vibrate vertically. Further, each output side support 5 is able to slide in the vertical direction H along a vertical slide guide 555 provided on the slide base 551.

Each output side support 5, as shown in FIG. 5, has an output side locking mechanism 56 for holding the output side support 5 so that it is not vibrated through the output side damper 76 when the output connection shafts 52 of the output side support 5 are to be connected to the output shaft 83 of the powertrain 8. Accordingly, it is possible to hold still the output side support 5 when the output connection shafts 52 of the output side support 5 are connected to the output shaft 83 of the powertrain 8, which makes the connection operation easier to perform.

The output side locking mechanism 56 of the present embodiment includes a vertical cylinder 561 (in this case, a hydraulic cylinder) that holds the output side support 5 against vertical movement. In the present embodiment, the vertical cylinder 561 is capable of stopping relative movement between the slide base 551 and the main body 51 of the output side support 5. Alternatively, the vertical cylinder 561 may be an air cylinder.

The powertrain 8 (which is an A/T) on which performance testing is performed by the powertrain testing apparatus 1 of the present embodiment is for a front-wheel drive vehicle. Accordingly, the powertrain 8 has the pair of output shafts 83 that are positioned on an axis that is different from that of the input shaft 82. However, unlike a powertrain for a rear wheel drive vehicle, the inter-shaft distances D1 and D2 between the input shaft 82 and the pair of output shafts 83 of the powertrain 8 will vary for different models.

Because of the variation in D1 and D2, as is apparent from FIGS. 2 and 3, the powertrain testing apparatus 1 is provided with the capability of changing the inter-shaft distances D1 and D2, in the vertical and horizontal directions, between the input connection shaft 42 of the input side support 4 and the output connection shafts 52 of the output side supports 5. This is achieved by (a) changing the initial position (the vertical position H) of the rods 611 in the vibration cylinders 61 of the vibration generator 6, and (b) changing the horizontal position W of the input side support 4 and the vibration generator 6 using the input side positioning unit 45.

Accordingly, the powertrain testing apparatus 1 is able to test performance of a variety of types of powertrains 8 having different inter-shaft distances D1 and D2 between the input shaft 82 and the pair of output shafts 83. As a result, the powertrain testing apparatus 1 offers outstanding versatility.

FIG. 3 shows a state in which the inter-shaft distances D1 and D2 in the vertical and horizontal directions between the input connection shaft 42 and the output connection shafts 52 have been changed, as compared to those in FIG. 2, as a result of operation of the vibration generator 6 and the input side positioning unit 45.

As has been described previously, the input side constant velocity joint 71 enables the central axis of the input connection shaft 42 of the input side support 4 to be eccentric with respect to the central axis of the input motor 21. Further, the input side support 4 can be vibrated in a direction orthogonal to the axis of the input motor 21 through the input side damper 75. Moreover, it is possible to make the central axis of the output connection shafts 52 of the output side support 5 eccentric with respect to the axis of the output motor 22 by provision of the output side constant velocity joints 72. In addition, the output side support 5 can be vibrated in a direction orthogonal to the axis of the output motor 22 through the output side damper 76.

Further, the vibration generator 6 includes the vibration cylinders 61. As a result, it is possible to vibrate the rods 611 in the vibration cylinders 61 using hydraulic fluid, whereby the input side support 4 is able to transmit the vibrations of the vibration generator 6 and the input motor 21 to the powertrain 8 with even greater effectiveness.

Moreover, the powertrain testing apparatus 1 includes the vibration generator 6 for vibrating the input side support 4. This makes it possible to simulate the vibrations transmitted from a road surface to the powertrain 8 that is attached to the attachment portion 411 of the input side support 4.

When the powertrain 8 is to be tested using the powertrain testing apparatus 1, the powertrain 8 is mounted in the powertrain testing apparatus 1 with: (a) the housing 81 attached to the attachment portion 411 of the input side support 4; (b) the input shaft 82 connected to the input connection shaft 42; and (c) the output shafts 83 connected to the output connection shafts 52 of the output side support 5.

Once the powertrain 8 is mounted in the above manner, the control unit obtains information regarding the model of the powertrain 8 via the input interface, and then changes (a) the initial vertical position H of the rods 611 of the vibration cylinders 61 of the vibration generator 6, and (b) the horizontal position W of the input side positioning unit 45. Following this, the control unit provides for connection of the input shaft 82 and the input connection shaft 42 and connection of the output shafts 83 and the output connection shafts 52 by changing the longitudinal position L of the output side positioning unit 55.

When the powertrain 8 has been mounted in the powertrain testing apparatus 1, the input motor 21 is started so as to simulate and replicate the rotation of an engine in vehicle travel. The input shaft 82 is thereby rotated via the input side constant velocity joint 71 and the input connection shaft 42, and, at the same time, the output shafts 83 are rotated via the output connection shafts 52 and the output side constant velocity joints 72, while subjected to inertial resistance from the output motor 22 and the flywheel 23.

If the vibration generator 6 is activated while the input shaft 82 and the output shafts 83 are rotatably driven as described above, the powertrain 8 is vibrated with the input shaft 82 and the output shafts 83 repeatedly moving between aligned and eccentric positions relative to the input connection shaft 42 of the input side support 4 and the output connection shafts 52 of the output side support 5. This repeated movement between aligned and eccentric positions is enabled by the constant velocity joints 71 and 72 and the dampers 75 and 76.

Accordingly, it is possible to both (a) rotatably drive the powertrain 8 whereby the input shaft 82 and the output shafts 83 are rotated, and (b) vibrate the powertrain 8 in a nearly resistance-free state with vibrations received from the vibration generator 6.

More particularly, when the powertrain 8 is tested using the powertrain testing apparatus 1 according to the present embodiment, the control device causes the input motor 21 to output a cyclical fluctuating torque by cyclically changing the current flow to the input motor 21. Accordingly, it is possible to simulate and replicate the rotational state of a combustion engine and to transmit a fluctuating torque rotational force to the input shaft 82 of the powertrain 8.

As previously noted, the control unit controls the current flow to the output motor 22 to simulate and replicate, through use of the output motor 22, the inertial resistance that is received from a road surface by the output shaft 83 of the powertrain 8. Further, the flywheel 23 connected to the output motor 22 enables the inertial resistance generated by the weight of the vehicle to be simulated and replicated as well.

Moreover, the control unit is able to simulate and replicate the vibrations that would be transmitted to the powertrain 8 from a road surface if the powertrain 8 were mounted in a vehicle during actual road travel, by causing cyclically reciprocal movement of the rods 611 of the vibration cylinders 61 of the vibration generator 6.

By controlling the input motor 21, the output motor 22 and the vibration generator 6 in the above-described manner, it is possible to create a simulated state that is very similar to that of a powertrain 8 mounted in an actual vehicle. Accordingly, performance testing, (more specifically, testing of shift operations, shock caused by engine stalling, and the like) for the powertrain 8 is provided in this simulated-mounting state. As a result, it is possible to improve the accuracy of the performance testing of the powertrain 8.

In addition, it is also possible to check for what impact (a) vibrations transmitted from a road surface and (b) vibrations transmitted from an engine have on the powertrain 8, and to check for occurrence of fluid leakage, abnormal sounds, and the like.

Thus, the powertrain testing apparatus 1 described above provides performance testing of the powertrain 8 while taking into consideration the impact of vibrations transmitted to the powertrain 8 from both a road surface and from a combustion engine, thereby improving the accuracy of the performance testing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A powertrain testing apparatus for testing performance of a vehicle powertrain provided with an input shaft oriented on a first axis and an output shaft oriented on a second axis offset from the first axis, the powertrain testing apparatus comprising:
   an input motor that simulates and replicates rotation of a vehicle-drive engine;
   an output motor that simulates and replicates load applied to the output shaft of the powertrain;
   an input side support including an input connection shaft for connection to the input shaft of the powertrain, and an attachment device for attaching a housing of the powertrain;
   an output side support including an output connection shaft for connection to the output shaft of the powertrain;
   a vibration generator that simulates and replicates vibration transmitted to the powertrain from a road surface during vehicle travel;
   a vertical adjustment unit for changing an inter-shaft vertical distance between the input connection shaft and the output connection shaft by relative movement between the input side support and the output side support; and
   a horizontal adjustment unit for changing an inter-shaft horizontal distance between the input connection shaft and the output connection shaft by relative movement between the input side support and the output side support.

2. The powertrain testing apparatus according to claim 1, wherein:
   the input motor and the input connection shaft are connected by a first constant velocity joint that allows the input motor axis to be eccentric relative to the axis of the input connection shaft; and
   the output motor and the output connection shaft are connected by a second constant velocity joint that allows the output motor axis to be eccentric relative to the output connection shaft.

3. The powertrain testing apparatus according to claim 2, wherein
   the vibration generator includes a vibration output shaft having an initial position that can be changed, and
   the vertical adjustment unit changes the inter-shaft vertical distance between the input connection shaft and the output connection shaft by changing the initial position of the vibration output shaft.

4. The powertrain testing apparatus according to claim 3, further comprising:
   an input side damper which is disposed between the input side support and the vibration generator and which enables the input side support to be vibrated; and
   an output side damper that is disposed between the output side support and a fixed surface on which the output side support is positioned, the output side damper enabling the output side support to be vibrated.

5. The powertrain testing apparatus according to claim 4, wherein the input side support includes an input side locking mechanism for holding the input side support to prevent vibration of the input side support and to thereby facilitate connection of the input connection shaft to the input shaft of the powertrain.

6. The powertrain testing apparatus according to claim 5, wherein the output side support includes an output side locking mechanism for holding the output side support to prevent vibration of the output side support and to thereby facilitate connection of the output connection shaft to the output shaft of the powertrain.

7. The powertrain testing apparatus according to claim 6, wherein the input motor is able to generate cyclical fluctuating torque in order to simulate and replicate vibration generated by the vehicle-drive engine.

8. The powertrain testing apparatus according to claim 1, wherein the output shaft of the powertrain is a pair of output shafts that are disposed on a single axis.

9. The powertrain testing apparatus according to claim 1, wherein
   the vibration generator includes a vibration output shaft having an initial position that can be changed, and
   the vertical adjustment unit changes the inter-shaft vertical distance between the input connection shaft and the output connection shaft by changing the initial position of the vibration output shaft.

10. The powertrain testing apparatus according to claim 9, further comprising:
   an input side damper which is disposed between the input side support and the vibration generator and which enables the input side support to be vibrated; and
   an output side damper that is disposed between the output side support and a fixed surface on which the output side support is positioned, the output side damper enabling the output side support to be vibrated.

11. The powertrain testing apparatus according to claim 10, wherein the input side support includes an input side locking mechanism for holding the input side support to prevent vibration of the input side support and to thereby facilitate connection of the input connection shaft to the input shaft of the powertrain.

12. The powertrain testing apparatus according to claim 10, wherein the output side support includes an output side locking mechanism for holding the output side support to prevent vibration of the output side support and to thereby facilitate connection of the output connection shaft to the output shaft of the powertrain.

13. The powertrain testing apparatus according to claim 1, further comprising:
   an input side damper which is disposed between the input side support and the vibration generator and which enables the input side support to be vibrated; and
   an output side damper that is disposed between the output side support and a fixed surface on which the output side support is positioned, the output side damper enabling the output side support to be vibrated.

14. The powertrain testing apparatus according to claim 13, wherein the input side support includes an input side locking mechanism for holding the input side support to prevent vibration of the input side support and to thereby facilitate connection of the input connection shaft to the input shaft of the powertrain.

15. The powertrain testing apparatus according to claim 14, wherein the output side support includes an output side locking mechanism for holding the output side support to prevent vibration of the output side support and to thereby facilitate connection of the output connection shaft to the output shaft of the powertrain.

16. The powertrain testing apparatus according to claim 15, wherein the input motor is able to generate cyclical fluctuating torque in order to simulate and replicate vibration generated by the vehicle-drive engine.

17. The powertrain testing apparatus according to claim 14, wherein the input motor is able to generate cyclical fluctuating torque in order to simulate and replicate vibration generated by the vehicle-drive engine.

18. The powertrain testing apparatus according to claim 13, wherein the output side support includes an output side locking mechanism for holding the output side support to prevent vibration of the output side support and to thereby facilitate connection of the output connection shaft to the output shaft of the powertrain.

19. The powertrain testing apparatus according to claim 18, wherein the input motor is able to generate cyclical fluctuating torque in order to simulate and replicate vibration generated by the vehicle-drive engine.

20. The powertrain testing apparatus according to claim 1, wherein the input motor is able to generate cyclical fluctuating torque in order to simulate and replicate vibration generated by the vehicle-drive engine.

* * * * *